Nov. 29, 1927.
J. BIERMANNS
1,650,593
PROTECTION OF ELECTRIC SYSTEMS
Filed Jan. 8, 1926
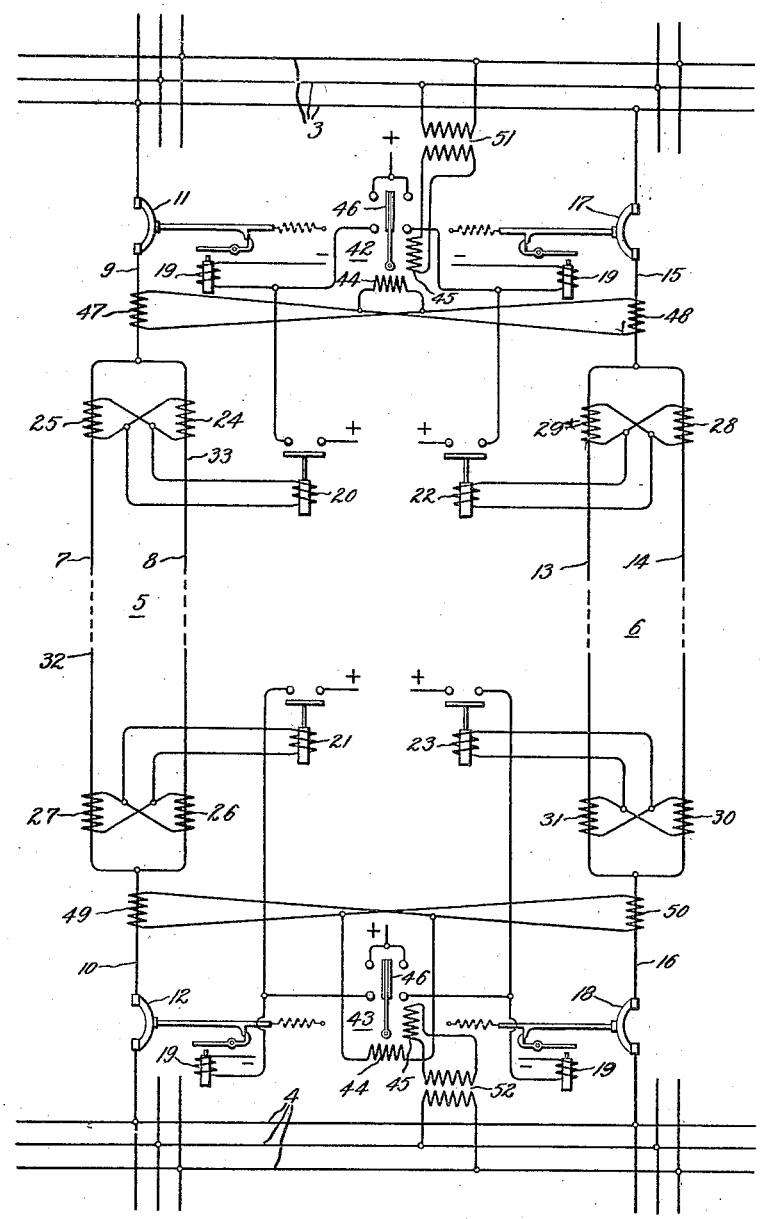
Inventor:
Josef Biermanns,
His Attorney.

Patented Nov. 29, 1927.

1,650,593

UNITED STATES PATENT OFFICE.

JOSEF BIERMANNS, OF KARLSHORST, GERMANY, ASSIGNOR TO GENERAL ELECTRIC COMPANY, A CORPORATION OF NEW YORK.

PROTECTION OF ELECTRIC SYSTEMS.

Application filed January 8, 1926, Serial No. 80,093, and in Germany January 29, 1925.

My invention relates to improvements in the protection of electric systems and more particularly to improvements in protective arrangements for an electric system having one or more line sections of conductor groups which are connected in parallel and each of which comprises two parallel conductors and a single conductor at each end thereof with suitable circuit interrupters in the single conductors. An object of my invention is to provide an improved protective arrangement whereby the number of circuit interrupters is minimized and special circuit interrupter structures are not required. A further object of my invention is to provide for a system comprising a plurality of sections, an improved balanced protective arrangement such that on the occurrence of a fault continuity of service is maintained on the sound sections without dependence on the graded time action of protective relays.

My invention will be better understood from the following description taken in connection with the accompanying drawing and its scope will be pointed out in the appended claims.

The single figure of the accompanying drawing illustrates diagrammatically an embodiment of my invention shown in single phase diagram for clearness and as applied to a section of an electric system between two points thereof such as station busses 3 and 4 which are connected by a plurality of conductor groups 5 and 6 in parallel. The group 5 comprises two parallel conductors 7 and 8 connected at their ends by single conductors 9 and 10 through circuit interrupters 11 and 12 to the busses 3 and 4 respectively. The group 6 also comprises two parallel conductors 13 and 14 connected at their ends by single conductors 15 and 16 through circuit interrupters 17 and 18 to the busses 3 and 4 respectively. To convey a concept of distance between the busses 3 and 4, the intermediate portion of each of the conductors 7, 8, 13 and 14 is shown in broken line. Trip coils 19 are provided for controlling the opening of the circuit interrupters 11, 12, 17 and 18. The single conductors 9, 10, 15 and 16 may be relatively short in comparison with the lengths of the parallel conductors 7, 8, 13 and 14. The parallel conductors 7 and 8, likewise 13 and 14, may be separately strung as overhead parallel lines or mounted in suitable cable forms for either overhead or underground construction, as is well known to the art.

For controlling the circuit interrupters through their trip coils 19 upon the occurrence of faults on the conductors 7, 8, 13 and 14, relays 20, 21, 22 and 23, which are arranged to control relatively movable contacts in the circuits of the trip coils, are provided. The relays 20 and 21 are arranged to be energized upon the occurrence of a disturbance in the balance of the currents normally carried by the conductors 7 and 8. For this purpose, the relay 20 is connected across equipotential points of a circuit comprising the secondaries of current transformers 24 and 25 at one end of the conductors 7 and 8, the secondaries being connected in series normally for circulating current. The relay 21 is likewise connected across equipotential points of a circuit comprising the secondaries of current transformers 26 and 27 at the other end of the conductors 7 and 8, the secondaries being connected in series normally for circulating current. The relays 22 and 23 are similarly connected in circuits comprising the secondaries of current transformers 28, 29, 30 and 31 in the conductors 13 and 14. It is assumed that the conductors 7 and 8 normally carry equal currents and that the ratios of each of the current transformers are the same and similarly for the conductors 13 and 14. If the conductors of a pair normally do not carry equal currents, the ratios of the current transformers may be so proportioned as to provide equal secondary currents in normal operation.

If now a fault occurs in the conductor group 5 at a point such as 32, the current in the secondary of the current transformer 27 becomes greater than the current in the secondaries of the current transformers 26 and 24. Under the effect of the difference currents in the respective pairs of current transformers the relays 20 and 21 operate to control the circuit interrupters 11 and 12 and thus to open the circuit of the conductor group at fault. If, however, the fault occurs near one end of a conductor group at a point such as 33, there will be a difference between the currents in the secondaries of the current transformers 24 and 25 and the relay 20 will operate to effect the opening of the circuit interrupter 11, but the currents in the secondaries of the current transformers 26 and 27 will not materially differ and therefore the relay 21 will not operate. Consequently the fault will continue to be fed through the circuit interrupter 12.

In order to avoid this difficulty, I provide in accordance with my invention means for selectively controlling the circuit interrupters 11, 12, 17, and 18 in the single conductors 9, 10, 15, and 16 respectively so as to maintain continuity of service on sound sections on the occurrence of faults and particularly through faults independently of graded time relay settings. This means, as shown, comprises relays 42 and 43—which are arranged to be energized in accordance with the differences between the currents in the single conductors 11 and 15, and 10 and 16, respectively.

The relays 42 and 43 may be of any suitable selective type, examples of which are well known to the art. As illustrated, they comprise cooperating current and potential windings 44 and 45 respectively, arranged to control suitable circuit controlling members 46 which are movable in one direction or the opposite thereto according to the direction of the current in the winding 44. The current winding 44 of relay 42 is arranged to be energized in accordance with the difference between the currents in the single conductors 9 and 15, that is, the difference between the sum of the currents in the conductors 7 and 8 and the sum of the currents in the conductors 13 and 14. For this purpose the winding 44 is connected across equipotential points of a circuit in which the secondaries of current transformers 47 and 48, arranged in the single conductors 9 and 15, are connected in series normally for circulating current. The current winding 44 of relay 43 is, for a like purpose, similarly connected in a circuit comprising the secondaries of current transformers 49 and 50 arranged in the single conductors 10 and 16. The potential windings 45 of relays 42 and 43 are arranged to be energized from the busses 3 and 4 through potential transformers 51, 52 respectively.

The relay 42 is so arranged that, when the current in the single conductor 9 exceeds the current in the single conductor 15 by a predetermined value, the contact controlling member 46 will be moved to the left to complete the circuit of the trip coil 19 of the circuit interrupter 11 and when the current in the conductor 15 exceeds the current in the conductor 9, the contact controlling member 46 will be moved to the right to complete the circuit of the trip coil 19 of the circuit interrupter 15. Similarly, if the current in the single conductor 10 or 16 exceeds the current in the single conductor 16 or 10, respectively, by a predetermined value, the relay 43 will effect the opening of the circuit interrupter 12 or 18 respectively.

If, now, a fault should occur on one of the twin or parallel conductors 7 and 8 at a point such as 33, the relay 20 will effect the opening of circuit interrupter 11 as heretofore described. The current in the single conductor 10 will now exceed the current in the single conductor 16 and the difference between these currents will flow through the winding 44 of the relay 43 in such a direction as to move the contact controlling member 46 to the left and thereby to complete the circuit of the trip coil 19 of the circuit interrupter 12. The relays 42 and 43 may be arranged to have a time delay action longer than that of the relays 20, 21, 22 and 23 so that the latter would take care of faults at points such as 32 while in case of faults at points such as 33 the relays 42 or 43 would operate to trip the desired circuit interrupter only after the relays 20, 21, 22 or 23 had operated. Therefore, with an electric system which comprises a plurality of interconnected sections similarly relayed, through faults irrespective of their intensity can not impair continuity of service on sound sections of the system since the operation of the relays 42 and 43 is dependent on the balance of the currents in the single conductors, that is, the difference between the currents and is independent of graded time actions.

What I claim as new and desire to secure by Letters Patent of the United States, is,—

1. In a protective arrangement for an electric system wherein a plurality of conductors are connected in pairs and wherein circuit interrupters are arranged for connecting said pairs in parallel, relay means for controlling the circuit interrupters of one pair of conductors connected and arranged to be energized in accordance with the difference between the currents in the conductors of said pair, and relay means for selectively controlling the circuit interrupters of two pairs of conductors connected and arranged to be energized in accordance with the difference between the sum of the currents in the conductors of one of said two pairs and the sum of the currents in the conductors of the other of said two pairs.

2. In a protective arrangement for an electric system wherein a plurality of conductors are connected in pairs and wherein circuit interrupters are arranged for connecting said pairs in parallel, relay means associated with each pair for controlling the circuit interrupter thereof connected and arranged to be energized in accordance with the difference between the currents in the conductors of the associated pair, and relay means for selectively controlling the circuit interrupters of two pairs of conductors connected and arranged to be energized in accordance with the difference between the currents traversing said circuit interrupters.

3. In a protective arrangement for a section of an electric system wherein conductor groups comprising two parallel conductors and a single conductor at each end thereof are connected in parallel and wherein circuit interrupters are arranged in the single conductors, means associated with two parallel conductors at one end thereof for controlling the circuit interrupters in the single conductor at that end in accordance with the difference between the currents in the two parallel conductors, and means for selectively controlling the circuit interrupters in two single conductors at one end of the section connected and arranged to be energized in accordance with the difference between the currents in the two single conductors.

4. In a protective arrangement for a section of an electric system wherein two conductor groups, each comprising two parallel conductors and a single conductor at each end thereof, are connected in parallel and wherein circuit interrupters are arranged in the single conductors, means associated with the two parallel conductors of each group at the ends thereof for controlling the circuit interrupter in the single conductor of the group comprising a relay arranged to be energized in accordance with the difference between the currents in the two parallel conductors, and means at the ends of the section for selectively controlling the circuit interrupters in two single conductors comprising a relay arranged to be energized in accordance with the difference between the currents in the two single conductors.

In witness whereof, I have hereunto set my hand this 18th day of December, 1925.

JOSEF BIERMANNS.